United States Patent [19]
Amort

[11] 3,966,318

[45] June 29, 1976

[54] APPARATUS FOR AUTOMATIC MICROPHOTOGRAPHY

[75] Inventor: Andrew L. Amort, Ann Arbor, Mich.

[73] Assignee: Xerox Corporation, Stamford, Conn.

[22] Filed: Mar. 25, 1975

[21] Appl. No.: 561,968

Related U.S. Application Data

[62] Division of Ser. No. 526,250, Nov. 22, 1974.

[52] U.S. Cl. .............................. 355/64; 214/8.5 F; 271/11; 271/107
[51] Int. Cl.² .................... G03B 27/32; G03B 27/52
[58] Field of Search .................. 355/64, 65, 50, 51; 214/8.5 F; 271/11, 107, 112, 62; 226/24

[56] References Cited
UNITED STATES PATENTS

| | | | |
|---|---|---|---|
| 2,999,686 | 9/1961 | Cheeseman et al. | 271/11 |
| 3,136,463 | 6/1964 | Froese | 355/64 |
| 3,378,255 | 4/1968 | Draugelis et al. | 271/62 |
| 3,493,302 | 2/1970 | Hintz et al. | 355/64 |
| 3,499,710 | 3/1970 | Sahley | 355/64 |
| 3,558,223 | 1/1971 | Hemphill | 355/64 X |
| 3,580,567 | 5/1971 | Hashimoto | 271/62 |

Primary Examiner—Richard A. Wintercorn

[57] ABSTRACT

An apparatus for filming a plurality of index or library cards is disclosed which feeds, spaces and photographs the individual cards automatically. The apparatus is provided with a means for sensing the height of cards in a stack, adjusting the height of the stack so that a feeding mechanism may properly engage the cards for delivering them to a belt. The cards are photographed on the belt and are held stationary thereon by means of an electric charge on the individual cards so that they adhere to the surface of the belt. Subsequent to being photographed, the cards are restacked in the same order as they were stacked prior to being photographed.

36 Claims, 11 Drawing Figures

3,966,318

APPARATUS FOR AUTOMATIC MICROPHOTOGRAPHY

This is a division of application Ser. No. 526,250, filed Nov. 22, 1974.

The present invention relates to a microfilm apparatus and more particularly to a microfilm apparatus which automatically feeds and photographs a plurality of documents or cards, for example, library cards, index cards or the like.

BACKGROUND OF THE INVENTION

Due to the proliferation of information that has become necessary for and available to business and government, it has become advantageous to reduce the physical volume that certain forms of information occupy. For example, it may be particularly advantageous to preserve the information normally contained on index cards, individual pages of books, library cards or the like in a microfilm format. In this way, it is possible to store the information in a manner which is reproducible for subsequent viewing and which enables subsequent reproduction for the information by duplicating the original cards from the microfilm negatives. The present invention provides an apparatus whereby a plurality of original index cards or library cards or the like may be microphotographed automatically. The particular advantages of such a system would of course include the automatic rapid information retrieval of the information stored in the negatives as well as large savings in space that microphotograph negatives enjoy relative to the original cards. This of course minimizes the volume required to store the information which was originally contained on those cards. This is especially true in this invention where several cards are photographed simultaneously so that one frame of a microphotograph may contain the images of several cards.

Since it is desirable to photograph several cards at one time and since heretofore cards and pages of books have generally been manually arranged in the format in which they are to be photographed, an automatic means for arranging and spacing of the cards from each other has long been needed. Of course, where cards are automatically photographed in a desired sequence, it is also important that the desired sequence be preserved by an automatic filming machine both before and after photographing the cards to maintain file integrity.

Accordingly, one object of the present invention is to provide an apparatus adapted to photograph a plurality of cards on a single negative.

Another object of the present invention is to provide an apparatus which automatically arranges cards within a frame to be photographed.

It is another object of the present invention to provide a means for maintaining file integrity of the card file which is automatically photographed.

Yet another object is to provide means for determining the number of cards to be photographed at one time.

An object of the present invention is to also provide a means for selecting the spacing between individual cards of the frame to be photographed.

It is an object of the present invention to provide means for holding the cards flat and immovable in the focusing plane of the camera while being arranged and photographed.

It is an object of the present invention to provide means of aligning cards in a stack to sense the height of the cards in the stack and adjust that height relative to a card feeder.

SUMMARY OF THE INVENTION

The above objects and others are accomplished in accordance with this invention, generally speaking by providing an automatic apparatus associated with a camera having a means for transferring the top cards from a stack thereof one after the other to an endless belt in response to a command signal, means for charging the cards with static electricity so it will lie flat and move with the belt without slippage, means for delaying the feeding of a subsequent card to provide uniform adjustable spacing between cards, means for automatically photographing a predetermined number of the spaced cards on microfilm and means for removing the cards from the belt and stacking them again in the same order as they were in when placed on the stack before they were microphotographed.

BRIEF DESCRIPTION OF THE DRAWINGS

The invention, together with further advantages and objects thereof, may be better understood by reference to the accompanying drawings in which.

DESCRIPTION OF THE PREFERRED EMBODIMENT

Before describing the operation of the filming apparatus of the invention, the various structural features thereof will first be described.

Figure 1:
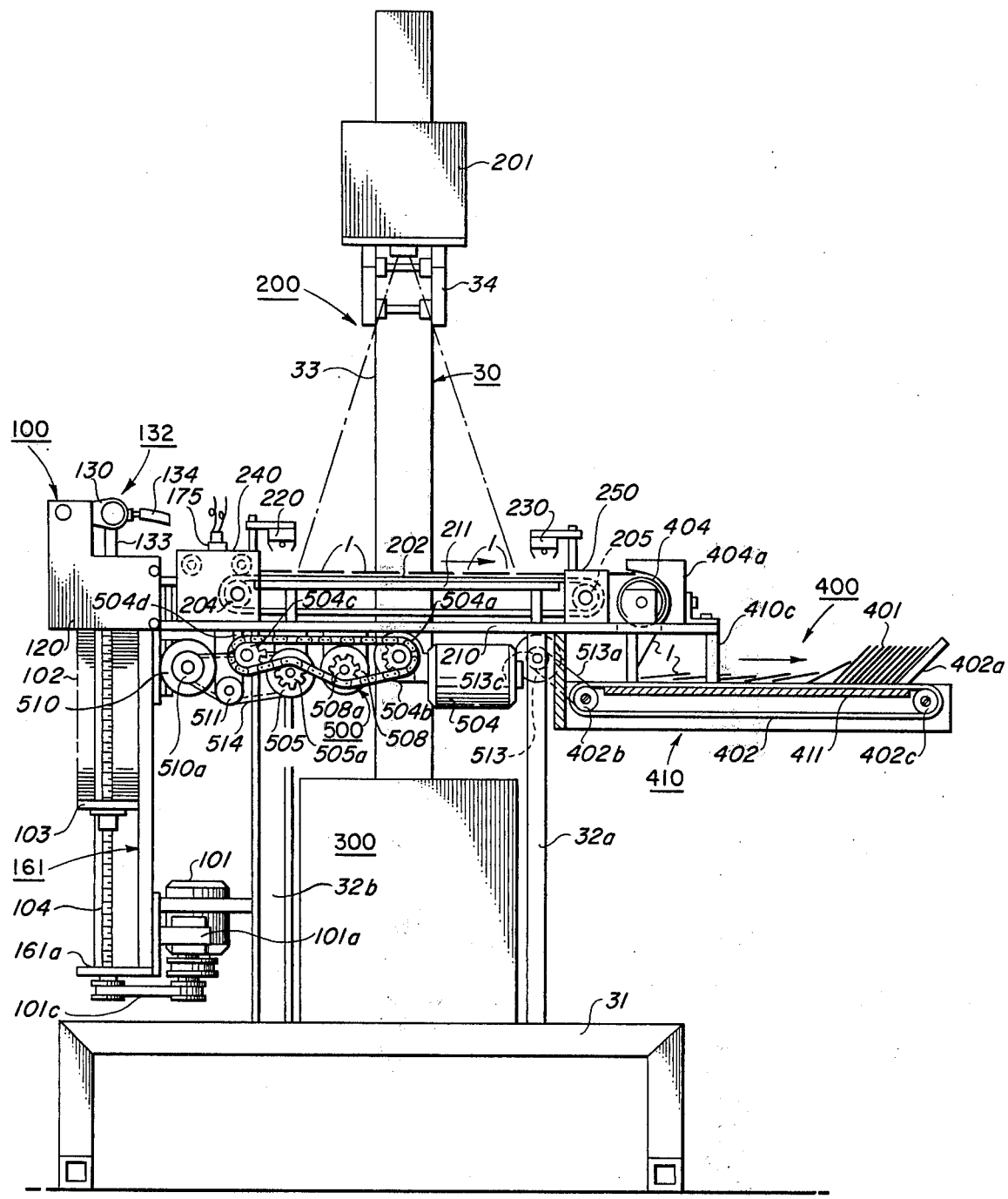
FIG. 1 shows a side elevational view of the automatic card photographing system.
Figure 2:
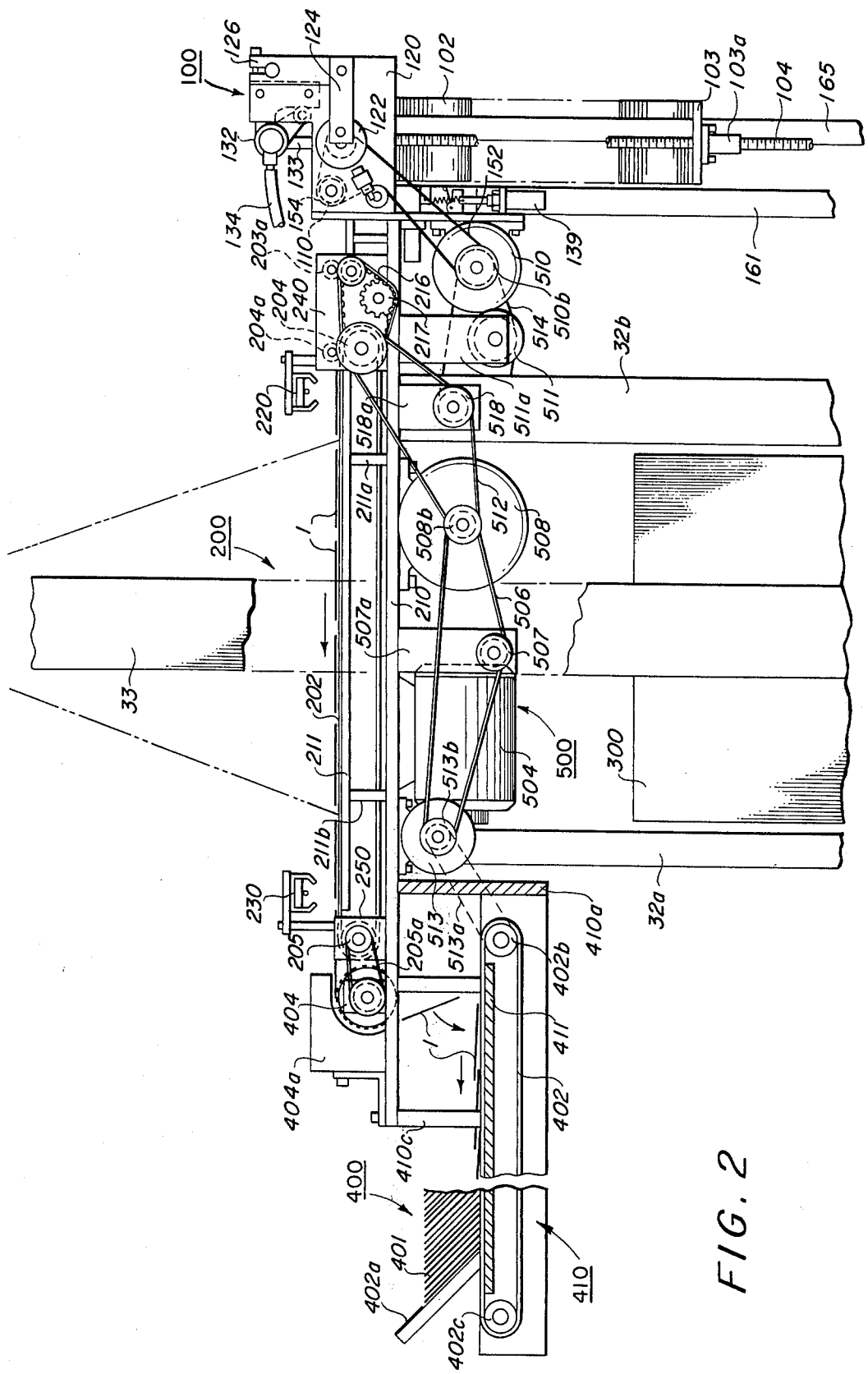
FIG. 2 is an enlarged side elevational view of the side opposite to that shown in FIG. 1.

FIGS. 1 and 2 illustrate the general overall configuration of the apparatus for automatic microphotography. In the representation of the apparatus in this specification, the numbers used indicate where various parts may be found. That is, numbers between 200 and 300 indicate parts belonging to a photographing section of the apparatus, parts between 100 and 200 belong to a mechanism for feeding cards, parts between 400 and 500 belong to a mechanism for receiving cards after they have been photographed and parts between 500 and 600 belong to a mechanism for supplying and transmitting motive power to the moving parts of the various mechanisms. In the drawings a general photographing section 200 is found in the upper center, with motive power section 500 disposed directly below the photography section 200. The photography section includes a camera 201, a belt 202 whereon the cards are photographed and associated mechanisms for advancing, arranging and photographing a plurality of cards. Feed mechanism 100 includes those parts utilized to remove individual cards from a stack of cards 102 and advance them to a belt 202. The feed mechanism 100 is found at the left of FIG. 1 and the right of FIG. 2. A card receiving mechanism 400 which is utilized to receive cards after they have been photographed on the belt 202 and maintain them in the order in which they were stacked in stack 102 is provided to the right of FIG. 1 and to the left in FIG. 2. An electronics package 300 is found centrally disposed beneath the motive power mechanism 500. The package 300 shown generally in FIG. 1 and FIG. 2 contains an electronic control system shown in detail in FIGS. 8A and 8B and which regulates the automatic operation of the overall apparatus.

The apparatus has an overall supporting frame 30 to which camera 201 as well as various subframes are attached.

The frame 30 includes a base 31, upright struts 32a and 32b and camera support 33. Camera support 33, by means of a height adjustment mechanism 34 retains the camera 201 in vertically adjustable relationship directly over belt 202.

The photography section 200 includes belt 202 located in the focusing plane of camera 201, and section 200 is provided with a horizontal planar subframe 210 disposed beneath belt 202 and operative to support various components of section 200. Horizontal planar subframe 210 is disposed below the camera and attached to frame 30 and bears supports 240 and 250 near the opposite ends of belt 202 as well as plate 211. The belt 202 is looped about a pair of longitudinally spaced rollers 204 and 205 supported by members 240 and 250 in bearings. Plate 211 supports the upper reach of the belt 202 and is used to keep the belt flat in the focusing plane for the camera. Plate 211 is attached to subframe 210 by means of struts 211a and 211b. Belt 202 thus provides a flat plane to support individual cards 1 to be photographed. The cards 1 are held down on the belt 202 by electrostatic forces generated by a corotron 220 secured to support 240. The belt preferably should have a surface which enables charged cards to electrostatically adhere thereto. A teflon, or polytetrafluoroethylene, surface is an example of such a surface.

Cards are fed to the belt by a feed apparatus generally indicated by number 100, as shown at the right of FIG. 2 and the left of FIG. 1. The cards 1 are stored prior to being photographed in a stack 102 which is supported by a platform 103. Subframe 161, attached to subframe 210, supports threaded rods 104 rotatably secured at the bottom of the feed apparatus 100 by bearings in a support 161a and at the top by bearings in a housing 120. The threaded rods 104 support platform 103 and provide a means whereby the platform may be elevated. A motive power source 101, a clutch brake 101a and a belt 101c are provided to rotate the rods 104 to elevate the platform 103 at appropriate times as determined by a control system generally shown as an electronics package 300 and illustrated in detail in FIGS. 8A and 8B.

The feeding mechanism also includes a suction cup pick up apparatus 132 supported by housing 120 and movably mounted thereto by cantilever members 130.

This mechanism removes cards 1 from the stack 102 to transfer them via a series of rollers (to be described in detail below) to the belt 202.

Cards are removed from the belt 202, after exposure, to another stack 401 shown at the left of FIG. 2 and the right of FIG. 1. An apparatus generally shown at 400 collects the cards 1 after photographs thereof have been made. A corotron 230 is provided to discharge the photographed cards 1 on the belt to enable them to be removed to the apparatus 400.

The apparatus 400 includes a subframe 410 attached to subframe 20 by struts 410a, 410b and 410c and which supports a pair of rollers 402b and 404c which rollers secure a belt 402. Belt 402 is maintained flat by means of a plate 411. An inverting means including a roller 404 and a block 404a is attached to subframe 20 and receives cards 1 between the roller 404 and the block 404a and deposits the cards 1 upside down on the belt 402.

The belt 402, which is caused to move at a slower rate than the belt 202 receives the cards in an inverted and overlapping fashion due to the slower speed. A stop plate member 402a is provided at the end of belt 402 and it is secured to frame 410. The cards are caused to butt against the stop 402a and the leading edge of the first card to contact plate 402 is caused to slide the card upward along the plate 402a as shown in FIG. 1. Because they overlap, the cards will form a stack against the plate 402a.

Motive power to run the belt 202, to operate the card receiving apparatus 400 and the feed apparatus 100 is supplied by a motive power transmission system generally indicated at 500 and disposed centrally within the overall apparatus below the belt 202. The system includes a motor 504 attached to subframe 210 which provides power for the feeding mechanism 100, for the belt 202, and for the card receiving apparatus 400.

A sprocket chain 504a is provided to transmit power from motor 504. The sprocket chain 504a is driven from motor 504 by motor output sprocket wheel 504b. An idler sprocket wheel 504c is also attached by strut 504d to subframe 210 and is provided for the chain 504a. Transmission 505 and clutch brake 508 are also attached to subframe 210 and are driven from chain 504a via their respective input sprocket wheels 505a and 508a.

A clutch brake 510 is attached to subframe 160 and is driven via transmission 505. A belt 514 connects the output of transmission 505 to the input pulley 510a of clutch brake 510. An idler pulley 511 attached to subframe 210 by strut 511a tensions belt 514. This is also illustrated in FIG. 2 which should also be referred to. Clutch brake 510, by means of belt 152 looped about the output pulley 510b, is operative to impart motion to the mechanical parts of feed mechanism 100 to feed cards in a manner described below.

The output of clutch brake 508 is taken at a pulley 508b. For purposes of driving belt 402 a gear reduction apparatus 513 is provided. A belt 506 is provided to transmit power to transmission 513 from clutch brake 508. The belt 506 is trained between output pulley 508b of clutch brake 508 and input pulley 513b of transmission 513. Idler pulley 507, attached to subframe 210 by means of strut 507a, tensions belt 506. The belt 513a is provided which transmits power from the output pulley 513c to roller 402b to drive belt 402.

A belt 512 is also provided to impart motion to belt 202. Belt 512 is trained between the output pulley 508b and roller 204. An idler pulley 518 is attached to subframe 210 by means of strut 518a and tensions belt 512.

It is to be understood that the various rollers, pulleys, and sprocket wheels described herein are to be retained in their respective struts or supports by appropriate bearings or bearing surfaces.

The apparatus for feeding the individual cards has been generally shown at 100 having a stack of cards 102 held on a platform 103. This will now be described in more detail. The platform 103 is vertically movable by means of motor driven screw threaded rods 104 so as to bring the top card 1 in proximity with a movable suction cup pick-up arm 133. This enables pick-up arm 133 to engage the upper most card 1 in the stack. When pick-up arm 133 removes a card 1 from the stack 102, it initially removes it vertically and means are provided to later move the individual card 1 horizontally. Nip rollers 110 and 110a are provided to remove the card 1 from the arm 133 when arm 133 brings the card into the nip formed between rollers 110 and 110a. A logic circuit is provided which generates a command signal to actuate the feeding mechanism and simultaneously the nip rollers 110 and 110a to move the card 1 to another set of rollers 203a and 203b. The set of rollers 203a, 203b are rotatably attached to support 240 as is roller 204; a companion roller 204a is also attached to frame 24 to form a pair of rollers 204, 204a. A belt 216 is trained between rollers 204 and 203a to impart motion to roller 203a. Roller pairs 204, 204a, and 203a, b run simultaneously with belt 202 and advance a card fed by nip roller pair 110, 110a directly to the belt 202.

The feed mechanism 100 is operated from clutch brake 510 independently of belt 202 and the rollers 203a, b and 204, 204a. The rollers 110, 110a and pick-up arm 133 are driven from clutch brake 510 only by means of belt 152. Clutch brake 510 thus controls the transmittal of power from motor 504 to the feed apparatus 100. Clutch brake 510 receives this power from motor 504 by means of belt 514 as has been described. In this way the card fed to the nip rollers 110, 110a is not fed to roller pair 203a, b until a subsequent feed signal from the control circuit causes a subsequent card to be removed from the stack 102 by energizing clutch 510. The nip roller 110 is attached to a pulley 154 which is driven by belt 152. Pulleys 153, 154 and 122 are all provided to be driven by belt 152 and are rotatably secured in a housing 120.

FIGS. 3 – 7 show more clearly the arrangement utilized for picking up and feeding induvidual cards. The feeding mechanism has a housing 120 having a wheel 122 rotatably mounted thereon and an eccentrically mounted push rod 124 is movably attached to wheel 122 and also to a lever 126. The lever 126 is mounted to a shaft 128 rotatably fitted in the frame 120. By means of cantilever member 130 a vacuum suction cup apparatus 132 comprising a plurality of suction cup arms 133, a manifold 133a and a vacuum line 134 are attached to a shaft 128. Vacuum may be provided from a suitable source and by means of line 134 to manifold 133a and arms 133 which are all provided with communicating passages to create a suction at cups 133b. The manifold 133a from which the suction cup arms 133 are suspended are pivotally mounted within the cantilever members 130. The suction cup arms 133 move individual cards from a stack of cards 102 which rests on pallet 103c on platform 103. The stack and platform 103 are raised by the threaded rods 104 which engage the threaded inner portions 103b of platform supports 103a. These threaded rods are turned by motor 101 in response to a signal from a sensor 138. This sensor includes a solenoid 139, a microswitch 140 and a T-shaped feeler 142. The threaded rods 104 are secured and rotatably mounted to housing 120 by bearings 136a at the top and by bearings 136b at the bottom thereof where the rods engage frame section 161a attached to frame 161.

The suction cup members 133b are provided with motive power to enable them to pick up a card from the stack by motor 504 shown in FIGS. 1 and 2. Clutch brake 510 allows the transferral of motive power upon receiving energization signals from the control circuit of FIGS. 8A, 8B. Belt 152 is trained about pulleys 153, 154, and tensioning idler pulley 155 to drive wheel 122 and roller 110. Rollers 110, 110a are provided and form a nip roller for engaging individual cards upon their removal from suction cup apparatus 133. Further a photoelectric cell 156 is provided to sense the rotation of the wheel 122, a single rotation of which corresponds to the feeding of a single card. By means of masking out a portion of a reflective surface on the periphery of wheel 122, for example by black tape 122a, photoelectric cell 156 may be de-energized. In this manner, a signal may be developed in the cell 156 indicative of one rotation of wheel 122 corresponding to the feeding of a single card. This signal may be utilized to actuate a mechanism to straighten the stack of cards 102. Such a mechanism is provided by this invention and is further illustrated in more detail in FIGS. 3 and 4 and will be described below with additional reference to these latter figures. The signal provided by sensor 156 may be also utilized to energize the brake of clutch brake 510 at an appropriate point during the feed cycle.

Also provided are rollers 203a and 203b rotatably mounted in support 240 which advance a card from the nip roller 110 and 110a to the belt 202. By means of belt 216, as well as idler wheel 217, the motion of roller 204 is both utilized to drive belt 202 as well as the rollers 203a and 203b. Clutch brake 508, by means of belt 512 and idler 518 controls the motion of roller 204, and when energized causes the belt 202 to move. Belt 506 is driven through clutch brake 508, and has a tensioning idler 207. Belt 506 drives the gear reduction unit 513 shown in FIG. 1 and 2. Hence, the operation of the brake portion of unit 508 stops both belt 202 and belt 402 at the appropriate time as determined by the control circuit. Power input to clutch brake 508, though not shown in complete detail in FIG. 2, is obtained from motor 504 by means of sprocket chain 504a which is shown in FIG. 1.

Figure 8A:
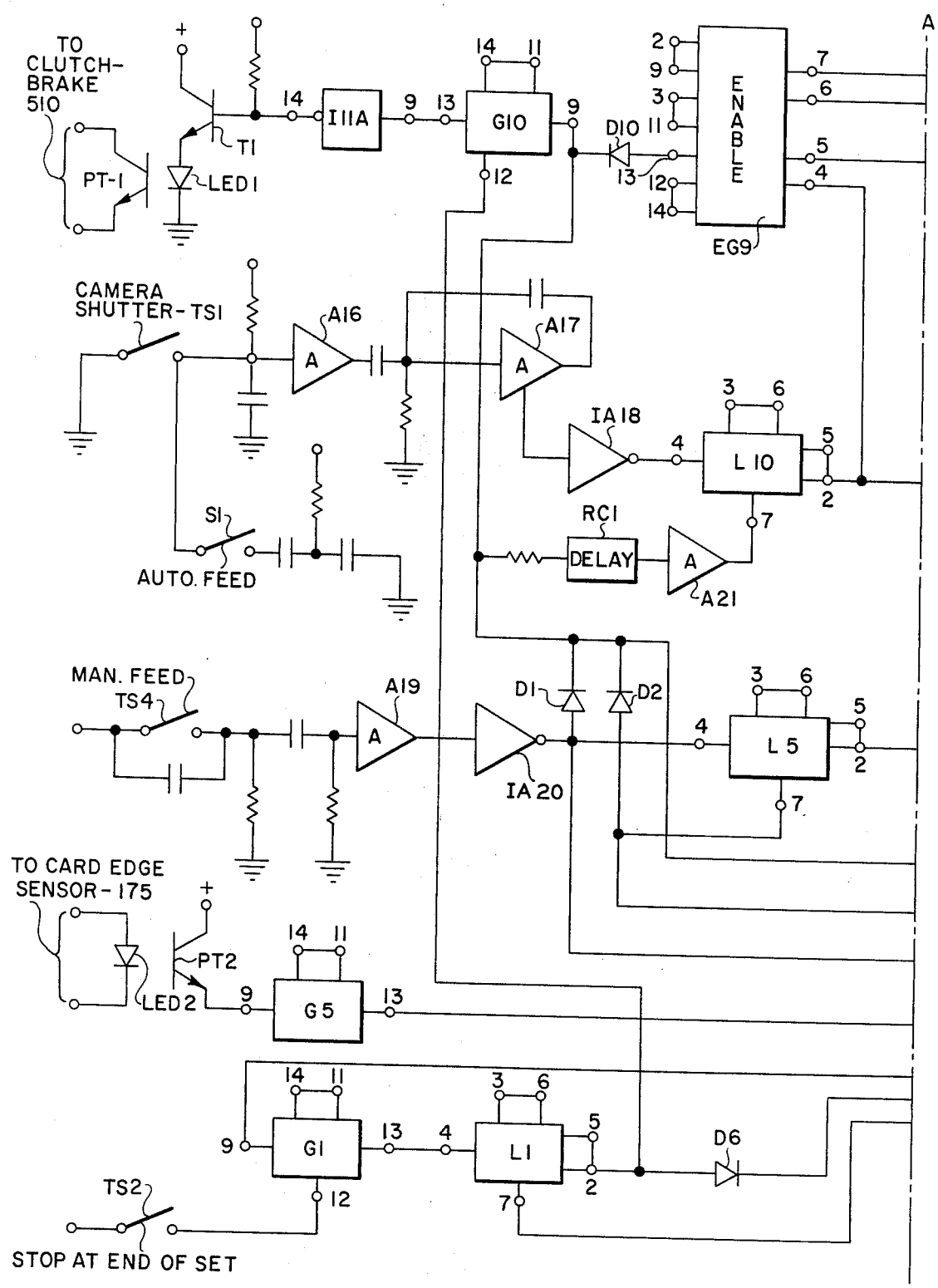
FIGS. 8A and 8B illustrate an electronic control system, and should be joined along dot-dash line A–B to form a complete diagram.
Figure 8B:
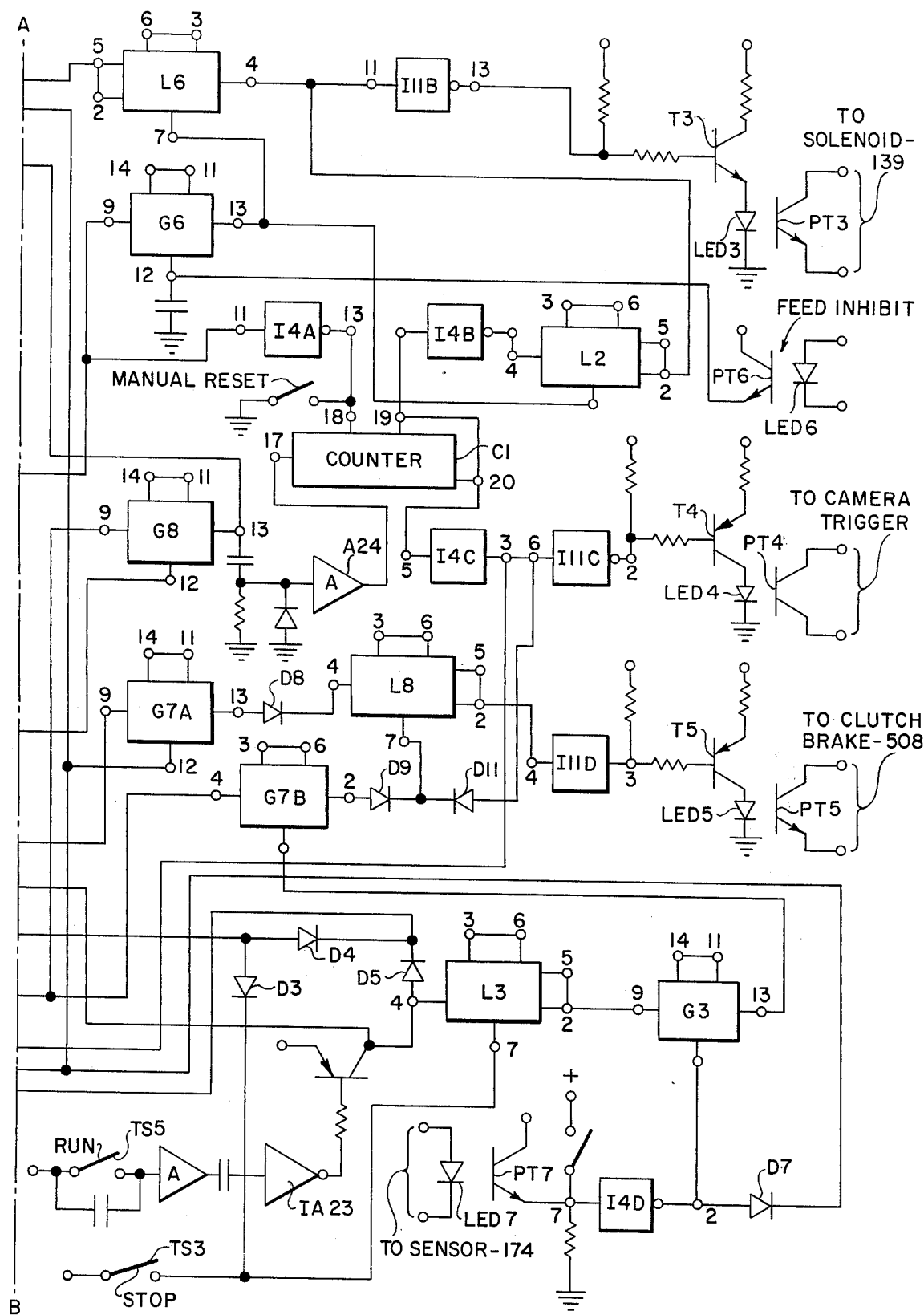
Figure 9:
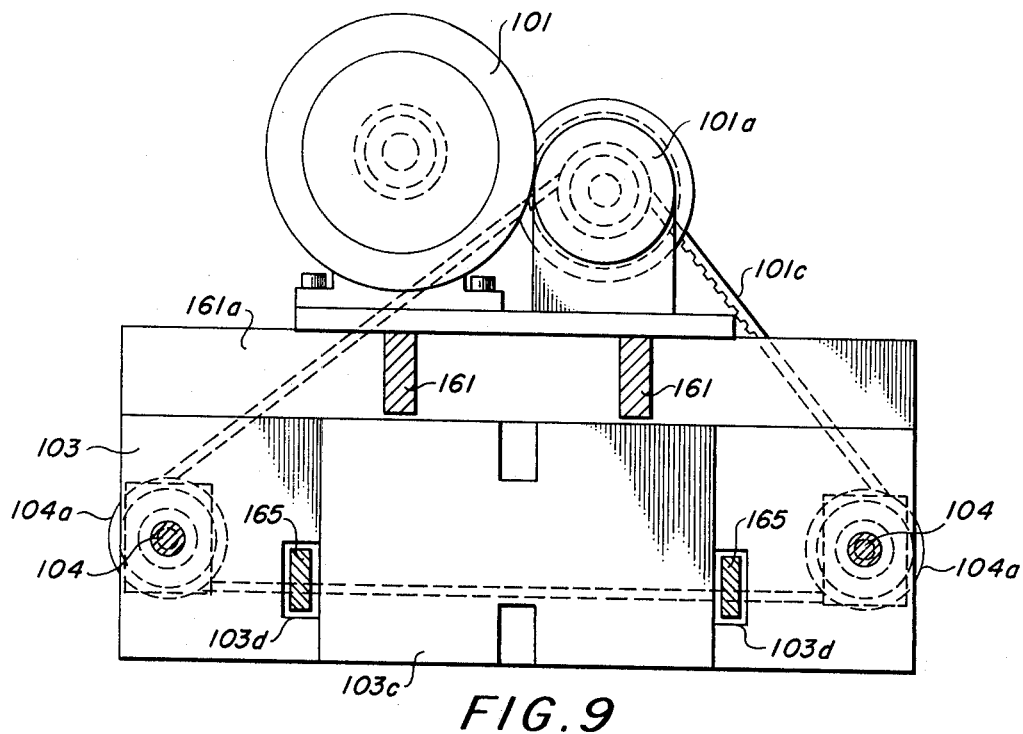
FIG. 9 is a horizontal sectional view taken along the line 9—9 of FIG. 3.

Upon energization of the clutch brake 510 by the control circuit of FIGS. 8A and 8B, the clutch is actuated to impart rotational motion to the wheel 122 by means of belt 152. This rotation displaces push rod 124 and lever 126. By moving push rod 124 and lever 126 the suction arms 133 suspended from cantilever 130 are initially moved vertically downward sufficient to contact a single card as they pivot about shaft 128. As the wheel 122 turns further, suction cups 133b, which now have a card attached thereto, are raised vertically. A cam roller 164 mounted on arm 162 which is fixed to the suction cup manifold 133a, cam 160 mounted to the frame 120 and cam surface 168 on cam 160 are provided. Cam roller 164 contacts surface 168 so that cam 160 and roller 164 cause the suction assembly 132 to move horizontally when a certain vertical height has been reached by the suction cup 133b. Thus, the card carried by the suction cup engages the nip roller 110 and 110a (as best seen for example in FIG. 6), for advancing the card to the belt 202. The nip rollers 110 and 110a are also rotated by belt 152 in the same direction as the horizontal direction imparted by the cam to the suction assembly 133.

The rollers 110 and 110a are rotated via belt 152. Roller 110 is rotated by means of an associated pulley 154 about which belt 152 is looped and is attached to roller 110. Roller 110a rotates due to frictional engagement with roller 110 or with a card 1 held in the nip between rollers 110, 110a. The size of the rollers may be selected so that the rollers 110 and 110a rotate at the same relative speed as the horizontal motion of the suction cups 133b and in the proper direction to remove the card therefrom.

The operation of the feeding apparatus is such that the speed of feeding the card to the nip roller 110 and the velocity achieved by the card through the nip roller 110 is substantially faster than the speed of a card moving along the belt 202. The feeding speed may be adjusted by selecting the diameter of an appropriate pulley such as wheel 122. This enables the cards fed to the nip rollers 110 and 110a to be stopped and the feeding mechanism to come to a halt before the card is required to be fed to the belt 202. This is important in the achievement of relative spacing between the cards and hence will be described in detail below. Card support bars 219a and 219b are attached to subframe 210 and they span the spaces between housing 120 and rollers 203a, b and between rollers 203a, 203b and rollers 204a, 204b, and are used to support and align the cards 1 to enable them to be properly fed from rollers 110, 110a to rollers 203a, b, to rollers 204, 204a and to belt 202.

Figure 3:
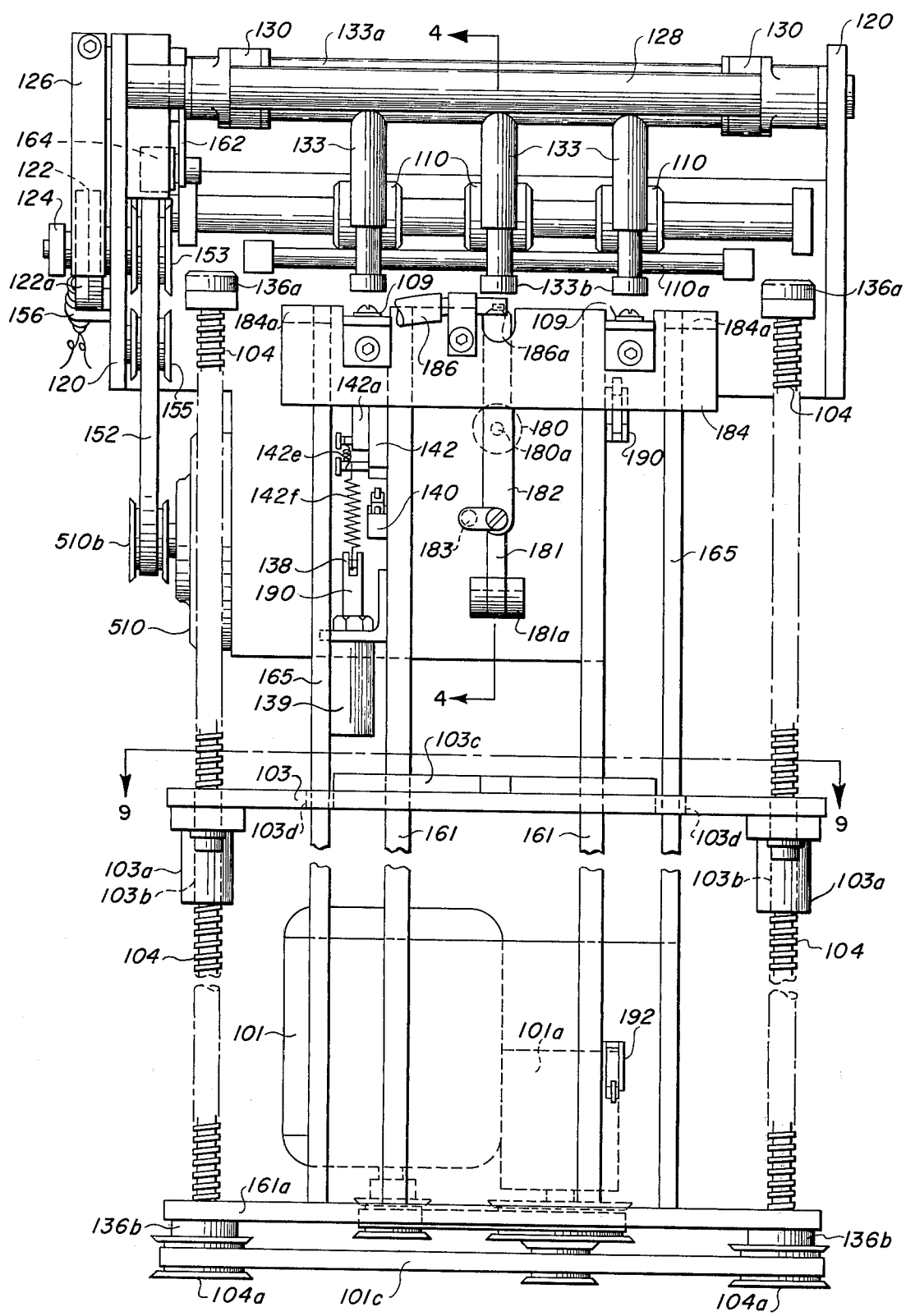
FIG. 3 is an end elevational view, showing the card feeding mechanism of the automatic card photographing system.

FIG. 3 also shows the provision of two limit switches 190 and 192 at the upper and lower ends of travel of platform 103. These switches engage the platform 103 at two positions and correspond to the extreme bounds of travel for the platform 103. For example, when the platform engages switch 190 both the motive power to raise the platform as well as the power to feed the cards is interrupted by the system since this position corresponds to the exhaustion of a supply of cards in the stack supported by the platform. On the other hand, if the platform is caused to contact limit switch 192, both the clutch 101a and the motor 101 itself are de-energized.

Figure 4:
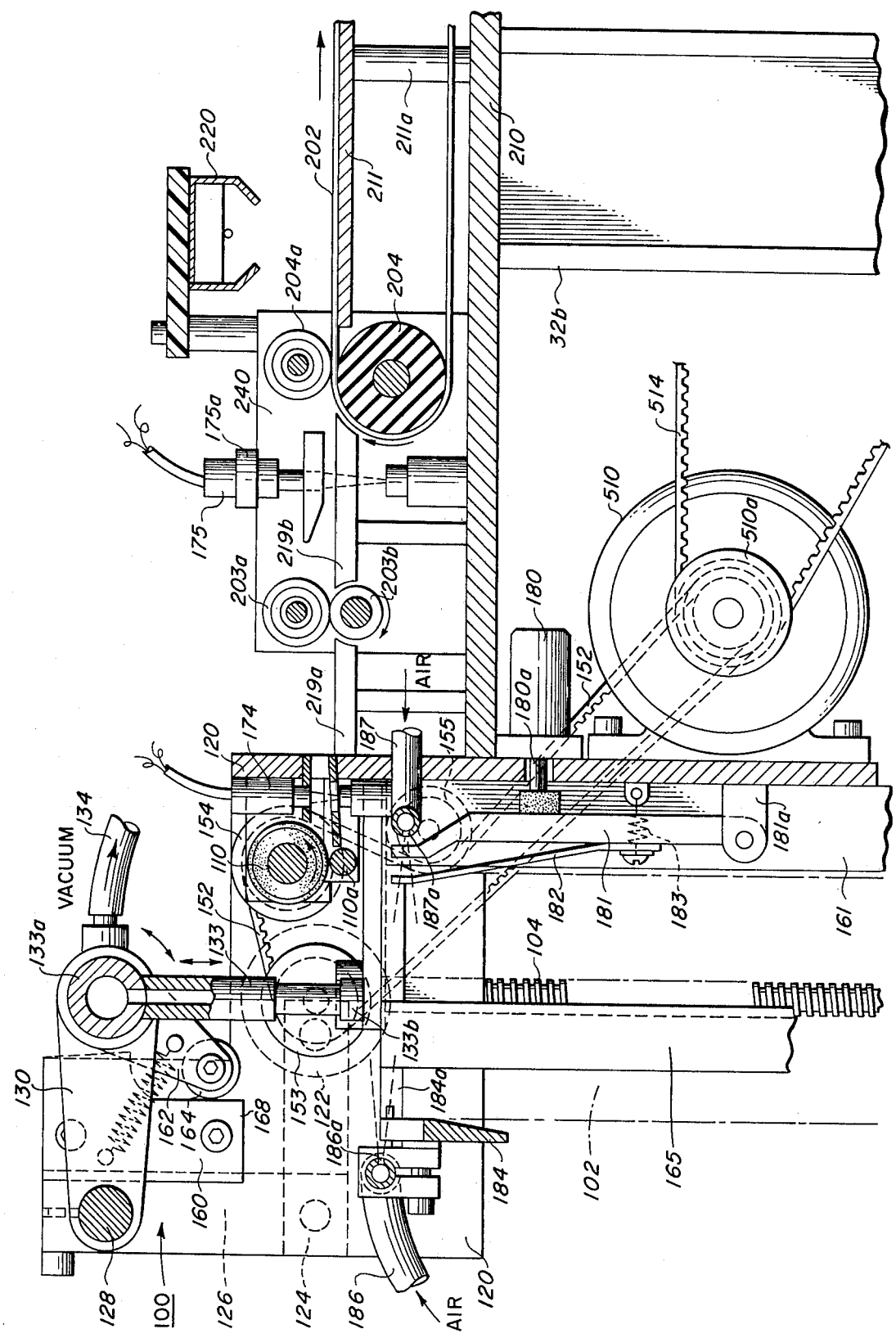
FIG. 4 is a longitudinal sectional view of the card feeding mechanism.

FIG. 4 shows the apparatus as described and shown in FIGS. 2 and 3 from the opposite side of FIG. 2 and in somewhat greater detail. FIG. 4 shows a stack of cards 102 the uppermost card of which is to be contacted by the suction cups 133b. As in FIG. 2, suction cup apparatus 133 are shown, and as they are vertically displaced, and as has been described, the suction cups remove a card from the stack 102 and insert it in the nip rollers 110 and 110a. When another card is removed, the card in the nip rollers is advanced to the next pair of rollers 203 and 203a. Photoelectric cells 174 and 175 are provided between roller pairs 110, 110a and 203a, 203b and between roller pairs 203a, 203b and 204, 204a respectively, and sense the presence or absence of the cards at appropriate positions. Cell 174 senses a card fed to the nip rollers 110 and 110a and 175 registers a card to be passed to the belt 202. Photoelectric cell 175 is also useful for applying a signal to an electric counter circuit included in the control circuit described below for counting the number of cards fed to the belt 202 so that after a predetermined number of cards are fed a photograph may be made. Both the photoelectric cells 174 and 175 sense the position of the cards 1. Cell 175 forms a means for locating the position of cards 1 relative to each other so that a constant space is maintained between them. Cell 174 sense whether a card was missed by the feeding mechanism and is operative to stop the feeding of subsequent cards. Each card 1 will thus have a definite location on the belt 202 and hence in the photograph. The operation of photocell pick ups 174 and 175, can best be described in conjunction with the overall control circuit for the apparatus shown in FIGS. 8A and 8B and thus will be described in conjunction therewith. Thus, depending on the position of the card as sensed by cell 175, the feeding of a card may be delayed an appropriate amount for the proper spacing between the predetermined number of cards to be photographed on the belt 202.

Figure 6:
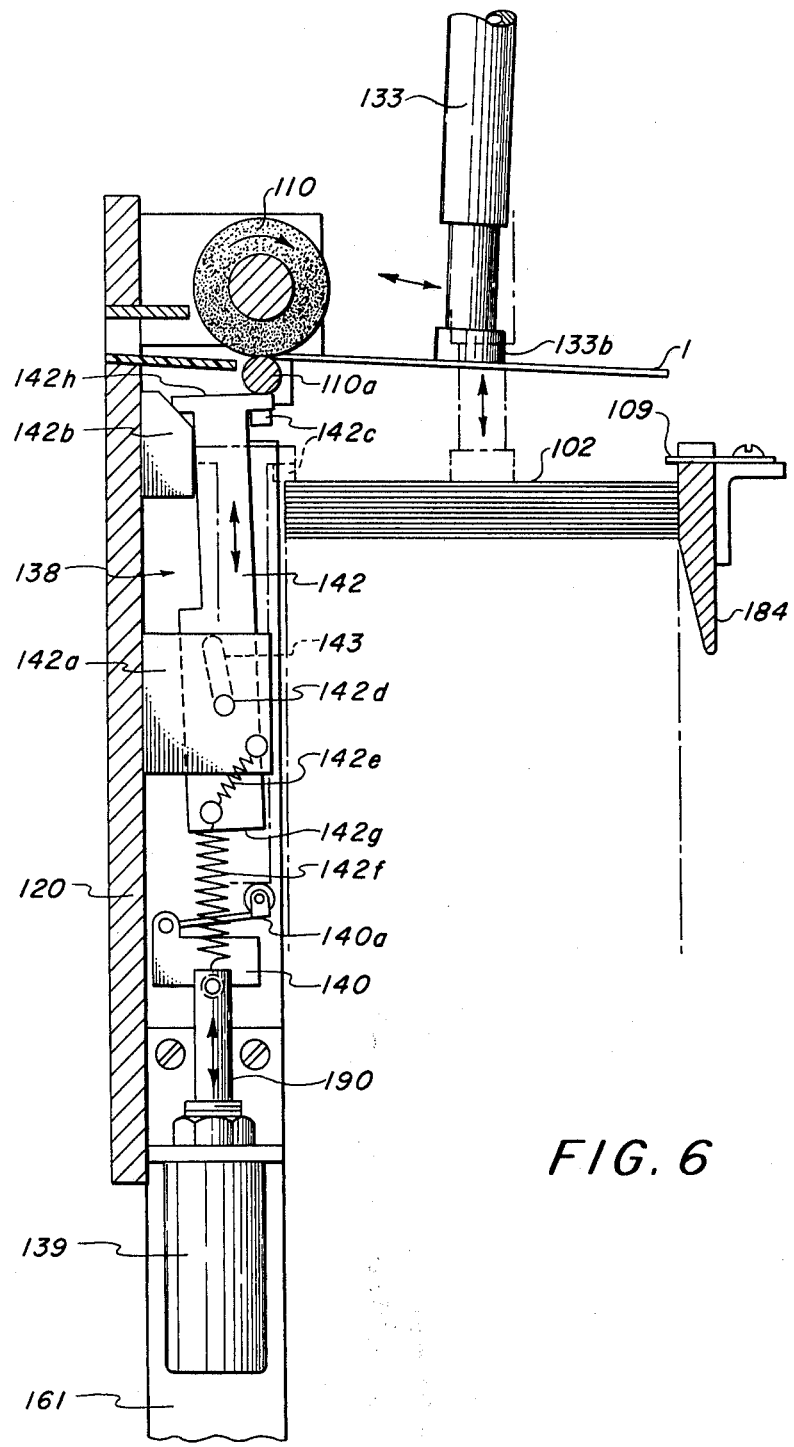
FIG. 6 is a sectional side elevation of the card height sensing mechanism.
Figure 7:
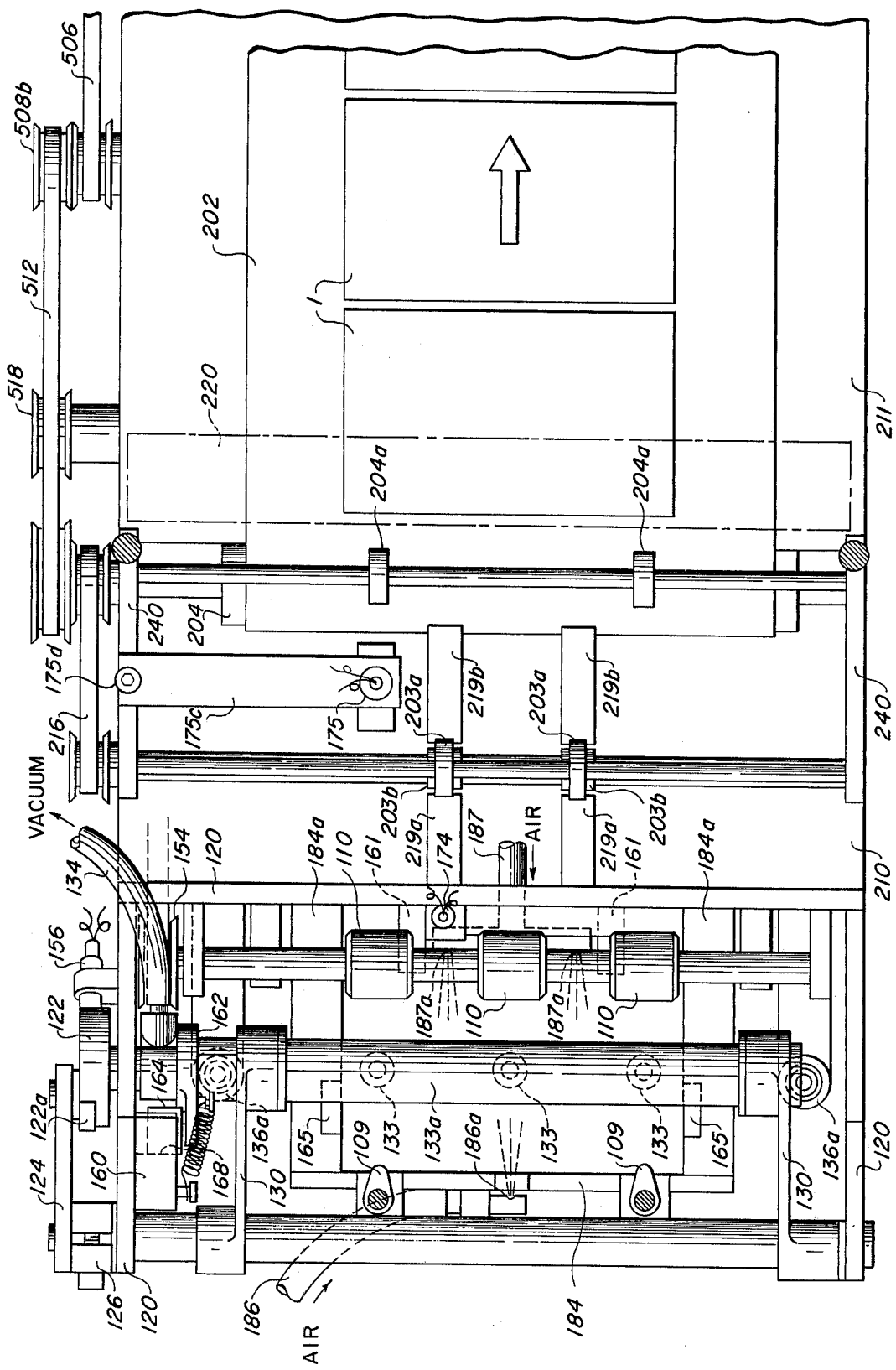
FIG. 7 is a top plan view of the feeding apparatus and a portion of the belt on which the cards are photographed.

FIG. 6 and FIG. 7 in a top view, also clearly show the position of sensors 174 and 175 which enable control of the spacing between cards 1 on the belt 202.

FIGS. 1, 2, 6 and 7 also show the position of corotrons 220 and 230 above belt 202. Corotron 220 is used to electrostatically charge each card as it emerges from roller pair 204 and 204a and is positioned close thereto so that each card is fully charged and thus adheres to the belt 202 when it is released by rollers 204 and 204a. Corotron 230 near the roller 205 is utilized to discharge the cards to enable them to be removed from the belt 202 by the card inverting apparatus 404.

FIGS. 3 and 4 also show apparatus for straightening the cards in the stack 102 disposed directly below rollers 110, 110a and adjacent the stack 102. The apparatus includes a solenoid 180, a lever arm 181 and a spring member 182 attached to the above arm 181. The arm is attached pivotally to housing 120 by pivot block 181a and is biased by spring 183 away from the stack. A back stop plate 184 is disposed next to a side of the stack 102 opposite to the arm 181. Plate 184 is attached to housing 120 by struts 184a. Piston 180a attached to the solenoid 180 is utilized to bring spring 182 into contact with the stack for straightening the cards and to push them against the back stop plate 184. A nozzle 186 having an aperture 186a to blow air into the stack so that the uppermost cards in the stack are easily removed. The nozzle 186 is attached to plate 184. The uppermost cards in the stack are separated in this manner. Nozzle 187 and aperture 187a perform in the same manner and are attached to housing 120 opposite to the nozzle 186. Solenoid 180 is energized during every feed cycle as has been described above, that is, it is actuated by the photocell unit 156 as shown in FIG. 2 in conjunction with a blacked-out portion on wheel 122. At such time that suction cup 133 has reached its maximum downward stroke to engage the card and a photocell of unit 156 encounters a blacked-out portion of wheel 122, solenoid 180 is actuated to move arm 181 and spring 182 to straighten the stack of cards between plate 184 and the spring 182. This also gives each card edge a reference point, that is, plate 184 form where it is fed to enable the proper registration and spacing of the cards.

Figure 5:
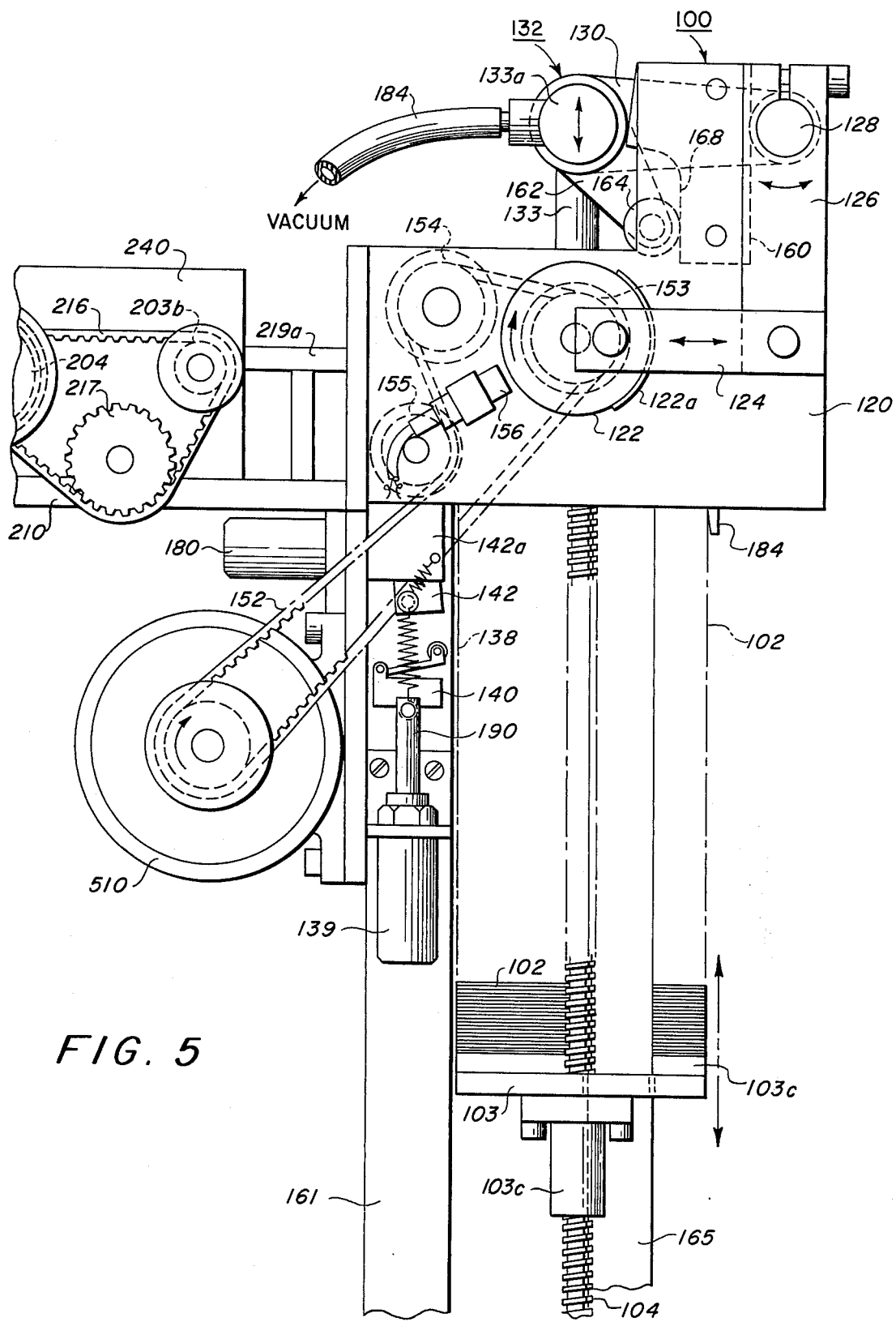
FIG. 5 is an enlarged side elevation of the card feeding mechanism seen from the side opposite FIG. 4.

FIG. 5 also shows the card height sensing means, which is also shown in greater detail in FIG. 6. As has been described above, the height sensing means is disposed directly below roller 110a in FIGS. 5 and 6 and includes a solenoid 139, a plunger 190, a mircoswitch 140, a T-bar for sensing card height and which slides within a frame 142a. A cam 142b displaces the bar 142 horizontally about the pivot point 142d. Springs 142e and 142f serve to displace the bar 142 so that flange 142c is in juxtaposition with the uppermost card in the stack 101 as illustrated in broken lines in FIG. 5. In response to a command signal from the logic circuit (having counted the predetermined number of cards to be photographed) the solenoid 139 is energized, causing a plunger 190 to be displaced in a downward direction. By means of spring 142f the T-bar 142 is displaced in a downward direction and tab 142h contacts cam 142b so that the T-bar 142 is displaced in a horizontal direction to move it to engagement with the uppermost card in the stack 102. Of course, the T-bar 142 is also displaced vertically so that point 142c engages the uppermost card. If the stack is too low, the lower surface 142g of bar 142 will contact the arm 140a of microswitch 140 so as to actuate the switch. In response to switch 140 being actuated, clutch 101a is to enable motor 101 to turn rods 104 to vertically displace the stack in the manner above. The stack is vertically displaced until the tension in spring 142f is overcome to a sufficient extent that T-bar 142 is displaced vertically sufficient to disengage microswitch 140. At this time the brake 101 is engaged and no more motive power is supplied to the thread rods and the stack is held in position. In this manner the stack is always raised to a height sufficient to enable the T-bar 142 to disengage and deactuate the microswitch 140. The position of these elements may be selected so that the proper height of the cards disengages the switch at the appropriate time. Spring 142e causes the T-bar to be pivoted horizontally to disengage it from the stack upon de-energization of the solenoid 139 for subsequent feeding of cards after exposure as controlled by the control circuit shown in FIG. 7.

Figure 10:
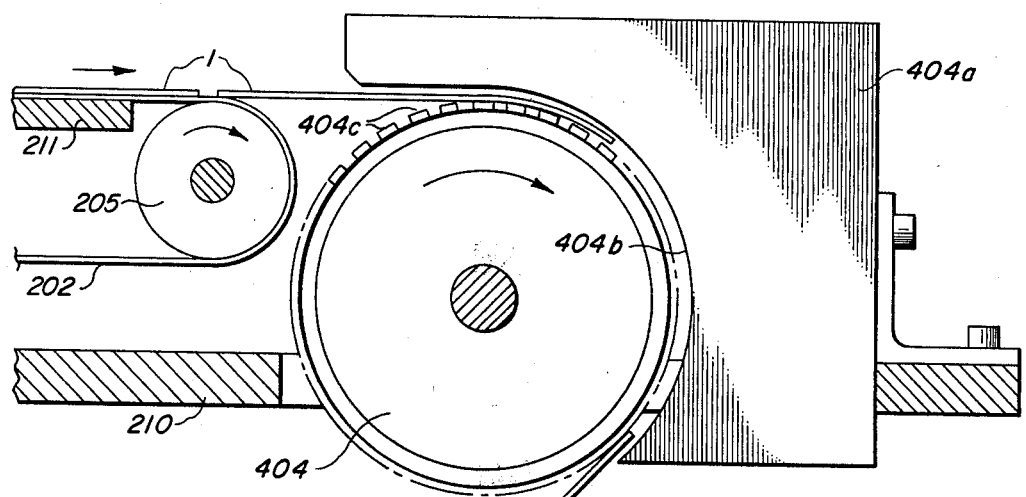
FIG. 10 is an enlarged side elevation of the card inverting mechanism.

The card receiver 400 now will be explained in greater detail with reference to FIGS. 1, 2 and 10. In the receiving apparatus, belt 402 is trained around roller 402c at its far end and around roller 402b near belt 202. The gear reducer 513 is provided so that belt 402 advances at a rate much slower than the velocity of belt 202. This is so that as the cards are individually removed from the belt 202 and upon being deposited on belt 402, they are caused to overlap so that when they engage with stop 402a towards the end of belt 402 they are caused to be stacked in the order that they were removed from the stack 102. An inverting roller 404 is provided adjacent the end of belt 202 so that cards may be caused to attach to the roller 404 and by means of a complimentary surface formed on block 404a the cards are inverted and fall upside down onto the belt 402. This mechanism will be seen more clearly in FIG. 10. The inverting apparatus as shown in FIG. 10 includes the aforementioned block 404a having a surface 404b complimentary to the roller 404. The surface 404b should extend about enough of the circumference of roller 404 to insure that the card fed between the roller 404 and surface 404b falls upside down on belt 402 when it is released from between the roller 404 and the surface 404b. The roller 404 may have a raised pattern 404c thereon which forms a card-gripping surface to ensure that the card is advanced between the roller 404 and the surface 404b. The roller 404 is driven by a belt 205a from roller 205. In this manner cards are caused to be stacked in the relationship and in the sequence in which they were originally found in stack 102 from which they were fed as they are caused to slide against plate 402a.

The overall operation of the microfilming apparatus of the invention may be best described and understood by reference to the operation of the control system as illustrated in the logic circuit of FIG. 7. The control system may be assembled from commonly available logic devices.

The nomenclature for the individual circuit devices of FIGS. 8A, 8B has been developed to indicate which individual devices may correspond to commercially available sub-circuits from which the individual elements may be obtained. For example, in the upper left hand corner of FIG. 8B, in latch circuit L6 and gate circuit G6, the numeral 6 indicates that both of these circuits may be found in a single integrated circuit module. The L prefixing the numeral 6 in the latch circuit indicates that according to the interconnection of pins on module 6 a latch circuit may be obtained. Similarly for gate circuit G6 the interconnection of the pins on module 6 as shown obtains a gate cirucit. Similarly inverter circuits I 11C and I 11D are shown. This nomenclature used indicates that an integrated circuit module 11 contains several inverter circuits if one connects the pins as shown. The prefix I indicates that the element shown is an inverter and the suffices C and D indicate that these are respectively of the third and fourth inverters found on module 11. The inverters as have been described change a high voltage signal to a low voltage signal. The operation of such inverters are well known but for clarity the opreation of a gate such as G6, and a signal appearing at pin 9G6 will be transmitted to pin 13G6 only on the condition that no signal is present on pin 12G6. The term "pin" corresponds to an appropriate input or output terminal of the device.

The latch circuit such as L6 operates in a different fashion however and has an interconnection of terminals 5L6 and 2L6 as shown. If a signal is absent from pin 7L6, when a signal is placed at pin 4L6, the latch circuit will produce a constant high voltage output. This is the "latched up" mode of latch operation; when the high voltage signal is removed form the output of a latch, this will be referred to as "unlatching" the latch. This high voltage is maintained until a high signal is placed on pin 7L6 at which time the voltage on the output or 2L6 is brought back to zero or be "unlatched".

The various circuit components may be obtained commercially; for example the inverters can be found on a UL900 integrated circuit and the amplifiers on a UL914 integrated circuit as supplied by Fairchild Semiconductors. The logic gates G and latches L may be obtained on a Signetics integrated circuit SN380A. Monsanto diodes MCT-6 can be utilized for the diodes D. All the logic devices can be obtained by connecting the pins of the integrated circuits according to the following description. The numeral following the letter suffix as 8 in G8 indicates that gate G8 may be constructed from the same integrated circuit module 8 as can inverter 18 by the connections as indicated. For example see G5 and L5. In this example if one connects the terminal 9, 14, 11, 13, 2, 3, 4, 5, 6, 7 of the same SN380A IC, one can obtain those circuits having the indicated terminals 9G5, 14G5, 11G5, and 13G5 for gate G5 and 4L5, 2L5, 3L5, 5L5, 6L5 and 7L5 for latch L5. The terminal designations such as 4L5 and 13G5 indicate by the numeral 5 succeeding the letter designation (L or G) that terminals 4 and 13 of the same solid state device 5 are being used to create different circuits, a latch or a gate (L or G).

The control system of FIGS. 8A, 8B is operative to control the card feed by means of energizing the clutch-brake 510 during the card feeding apparatus 100 as has been described. This is accomplished by energizing transistor T1 with a pulse so as to excite light emitting diode LED1 which turns on a phototransistor PT1 by the transmission of light between these two elements. When phototransistor PT1 is actuated, the clutch of clutch-brake 510 is engaged and power is transmitted from motor 504 to the feed mechanism and as has been described a card is fed to the nip rollers 110 and 110a. Control of the feed is essentailly accomplished by two control devices, gate G10 and circuit NG9. Gate circuit G10 will transmit a signal to transistor T1 only under the conditions that no signal is present on pin 12G10. Input pulses are applied to the gate G10 at pin 10 from essentially three sources.

The first source and most important in the normal operation of the circuit are output signals from pin 13NG9 of gate NG9; diode D10 steers these signals to the input 9G10 of gate G10. The gate circuit NG9 is so constituted that an output is present at 13NG9 only on the condition that input is present on pins 4NG9 and 5NG9 and no input is present on pins 6NG9 and 7NG9. Therefore, any signal present at 6NG9 and 7NG9 will interrrupt the feeding of the cards. For example, a signal present on pin 7 indicates that a counter circuit C1 has counted five cards or that an inhibit signal has been presented to gate G6 in such a manner as to present a signal at pin 7NG9. A signal at pin 6NG9 indicates that card detector 174 has failed to detect a card fed into the nip rollers 110 and 110a. This prevents a feed signal from being presented to the clutch brake 510 by means of the circuit NG9. Every time a card is sensed by a card edge sensor 175, there will be an input present at pin 5 of the gate circuit NG9.

Feed signals are applied to terminal 9G10 from two other sources. A manual feed signal is derived by the depression of toggle switch TS4, which by means of amplifiers A19 and a inverting amplifier A20, and steering diode D1 applies a signal to 9G10 to manually initiate feeding in the card. Similarly the connection of run switch TS5 applies a continuous run signal to gate 9G10 to cards continously by means of amplifier A22 and inverting amplifier A23 and steering diode D2.

When a new stack of cards is placed on a platform 103 and the card stack height is elevated properly, by means of manual energization of the clutch-brake 101a to raise the stack of cards to the correct height. The manual feed switch TS4 is closed and a single card is fed to the nip rollers 110 and 110a. At this point the detector 174 should detect a card present in the nip rollers. If this is so, by means of inverter I4D, a low voltage pulse will be placed at pin 12 of gate G3 and by means of diode D7 a low voltage pulse will be placed at pin 12 of gate G7A. This means that whenever a card is present at detector 174 these gates are conductive.

When the manual feed switch TS4 is closed, a signal is placed at terminal 9 of gate G7A through diode D1; which presents a positive pulse through diode D8 to terminal 4 of latch L8. This means the output of the latch at terminal 2L8 is high, inverter I11D inverts this high signal to a low signal and by means of transistor T5 actuates photo diode LED. Phototransistor PT5 operates in conjuction with LED5 (in a manner similarly to phototransistor PT1, diode LED1, and transistor T1 as has been described for the card feed) to actuate the clutch of clutch-brake 508 to drive the belt 202.

Depression of the manual feed button TS4 a second time feeds a second card and the first card fed to the nip rollers is passed through to rollers 203 and 204 whereat their leading edge is sensed by the leading edge detector 175 which by means of light emitting diode LED2 and phototransistor PT2 presents a signal to gate G5 at terminal 9G5. The output of G5 is high when a card is sensed and this signal is presented to gate G8 at terminal 9G8 and to terminal 4G7B of Gate G7B. Since the run switch TS5 has been closed, the output of amplifier IA23 causes the latch L5 to be maintained in the zero position and the output of latch L5 is passed to terminal 12 of gate G8 so that G8 passes any signal appearing at terminal 9G8 thereof through amplifier A24 into a counter circuit C1. The output of gate G8 is also fed to terminal 5NG9 of negate NG9 which instructs the card feeder to feed another card in the manner described. Therefore, upon the proper registry of a card with edge sensor 175 an instruction is automatically given to feed another card since gate G8 is actuated by the sensor 175. This is true under all conditions unless a card is missed by detector 174 in which case a signal appears at terminal 7 of NG9 or the counter has reached the maximum count of cards and the feed has stopped momentarily so that a photograph may be made of the number of cards that have been counted and are present on the belt 202.

As soon as a card is detected by edge sensor 175, as has been described, a signal is transmitted through gate G8 to terminal 13G8 and by means of amplifier A24 the counter C1 begins a count. This counter counts the number of cards fed. After each registration signal from sensor 175 appears at G8, immediately a signal from terminal 13G8 is presented to input terminal 5NG9 to feed another card. When another card is fed, the sensor 175 senses the card immediately preceeding the card being fed. The sensor signal is applied by means of gate G5 again to gate G8 which in turn presents another feed signal to NG9 at terminal 5NG9. The output of G8 is of course, as has been described, also fed to the counter C1; so that for every feed signal the count increases.

When the count reaches a predetermined maximum number for example as is shown in the diagram of FIGS. 8A, 8B, five cards have been counted, the feeding is stopped in the following manner. At the count of five, an output is obtained at both terminal 20 of the counter C1. This output is applied to inverter I4C which, by means of steering diode D11, turns off the latch L8 which had been initially turned on by the closing of the manual feed switch TS4. This operates to turn on the brake of clutch-brake 508 and stop the belt 202. Also be means of inverter I4B, the latch L2 is turned on. This applies a signal to inverter I11B which by means of transistor T3 light emitting diode LED3 and phototransistor PT3 turns on the card height sensor, which has been described above, for sensing the height of cards in the stack and raising and lowering the stack in response thereto. Further, latch L6 is energized so that this latch places a positive pulse at terminal 7NG9 of gate circuit NG9 which interrupts the feeding of the subsequent cards. Further, the output of terminal 20 counter C1 is also fed by means of I4C to inverter I11C which by means of transistor T4 light emitting diode LED4 and phototransistor PT4 energizes the trigger of the camera for exposing the film. When the camera shutter closes, switch TS1 is closed. This presents a pulse through amplifiers A16, A17 and inverting amplifier IA18 to the input 4L10 of latch L10 which is turned on the latch latches up to present a positive signal at terminal 9G6 of gate G6. Unless there is a signal from the feed inhibit terminal 12G6, gate G6 passes signals to terminal 7L6 of latch L6 which unlatches the latch to remove the high signal from terminal 7NG9 of NG9. This permits a further instruction to feed another card for another series of five cards. Simultaneously when the latch L10 latches up in response to the shutter closing the reset of counter C1 is set by means of inverter 14A which is attached to terminal 18C1 of the counter for the resetting thereof. The counter now returns to zero and when an input is obtained through gate G8 from card sensor 175 subsequent cards are sensed thereby and counted as above.

In the normal situation the card edge sensor 175 and the missed card detector 174 will detect cards corresponding thereto. A feed signal will be applied to gate G10 in the manner described and subsequent cards will continue to be fed. When a signal appears at the output 13NG9 through diode D10 it is also fed to terminal 9G7A of gate G7A. If the card edge sensor 175 detects a card, terminal 12G7A will be high and no input will actuate latch 18 to stop belt 202 via brake 508. If of course the missed detector 174 does not detect a missed card so as to shut off G7A, the latch L8 will be latched up, and a positive signal will be presented to the inverter I11D and the clutch of clutch-brake 508 will be actuated in the manner as has been described and rotation of the belt 202 will be reinitiated. The output from gate NG9 also unlatches latch L10 which was latched by the signal corresponding to the closure of the shutter. This is accomplished by means of amplifier A21 and delay circuit RC1. This unlatching removes the signal from the base of latch L6 and latch L2 by removing the input from gate G6 upon the command signal for a card to be fed subsequent to the closure of the shutter.

A feed inhibit cirucit consisting of photodiode LED 6 and phototransistor PT6 is provided to shut off the gate G6 to prevent the unlatching of latches L6 and L2. This means that the output of G6 is always constrained to be zero as long as the feed inhibit signal is supplied feed will thus be inhibited as long as L6 is maintained in the latching state, since a signal will always be supplied at terminal 7 of gate NG9 so as to prevent the transmittal of a feed signal to G10 through gate NG9. The feed inhibit is useful for stopping the feed when the leading and trailing edge of film in the camera is sensed so that no cards are lost due to an attempt to photograph cards on the leading or trailing edge where no photographs are to be made.

The control system also works in the following manner to control card feeding if the missed card detector 174 does not register a card in the nip rollers. This corresponds to the failure of the suction cups to feed a card from the stack. In this instance, a signal will be supplied from sensor 174 to light emitting diode LED7 which in combination with phototransistor PT7 supplies a signal through inverter I4B to terminal 12 of gate G3. Since in response to the run signal latch L3 is latched up there will be always an input at terminal 9G3 of gate G3 so as to cause gate G7 to be turned off to prevent the unlatching of latch L8. Latch L8 must be maintained in the latch state to enable clutch-brake 508 to be activated and to continuously drive belt 202. However, when no card is detected, gate G3 is turned off by means of a supply from inverter 14D to terminal 12G3. When this gate is turned off gate G7 is turned on, supplying a pulse through diode D9 to terminal 7L8 of latch L8. This unlatches the latch L8 causing the brake of clutch-brake 508 to be applied to stop the turning of the belt 202. Also, when a card is missed a signal is supplied by means of diode D7 to terminal 6 of gate NG9 to prevent the feeding of a subsequent card. Hence in this instance when a card is missed both the belt is stopped and the gate NG9 prevents the transmission of a feed signal from gate G8 to the card feed clutch 510. This signal may be overridden by pressing the manual feed button TS4, which bypasses the gate NG9 to order the feed mechanism to attempt to feed another card. If this feed is successful, the missed card detector 174 will detect the feeding of another card, the gate G3 will be turned on, the latch signal will be removed from latch L8 and an input will be made by means of diode D1 to terminal 9 of gate G7 so as to pass the signal to terminal 4 of latch L8 to latch this circuit up. This re-energizes the clutch 508 and the belt 202 will rotate. The control system always signals gate G10 to feed a card except when the maximum number of cards have been counted by counter C1 or a card fails to register at either sensor 174 or 175. In these latter cases the feed mechanism as well as the belt 202 are interrupted.

A further control, the "stop at five", TS2 is also provided. If this switch is activated a gate G1 will be closed. If switch TS2 is opened, the stop at five circuit will be operative. Hence a signal coming out of terminal 20C1 of the counter C1 is applied by inverter I4C to the terminal 9G1 of gate G1. If the "stop at five" switch is opened, there will be no gate signal at terminal 12 G1 of gate G1 and the pulse supplied from terminal 20 of the counter will be applied to latch up latch L1. If L1 is latched up in this instance, a signal will be supplied from the latch to terminal 12 of gate G10. This prevents any signal after the five cards have been counted from actuating subsequent feeding. This means that the "stop at five switch" TS2 must be opened again in order to enable the subsequent manual feeding of any subsequent cards after five cards have been counted.

Of course, the counter need not be set at five cards, any number may be counted before the photograph is made. The counter may be set for example to stop at 4, 3, 2 or 1 corresponding to the placement of the output signal. For example, rather than taking the output for control of the camera trigger and the clutch-brake and so forth from pin 20C1, another terminal which corresponds to a four-card count may be used. A counter having a count higher than five may be used, e.g. three cards may be utilized to actuate the automatic photographing of cards.

From the above discussion of the operation of the control circuit it will be apparent that since the subsequent feeding of a second card is controlled by the card edge sensor 175, no subsequent card is fed until the card edge sensor 175 encounters a card. It is apparent in referring to FIG. 4 in conjunction with the control circuit of FIGS. 8A, 8B that if the sensor 175 is, for example, positioned closer to backstop 184 a card will be encountered earlier by the sensor 175 and hence a feed signal will be supplied sooner to feed the second card. Since this is true and since the feed mechanism 100 moves more rapidly than the belt 202, the second card which is fed to the nip roller will of course be physically closer to the trailing edge of the card encountered by cell 175. If sensor 175 is moved farther away from backstop 184, the feeding of a second card will be later and there will be a greater space between cards on the belt 202. In this manner the spacing between the cards may be controlled by positioning the cell 175. FIG. 6 which is a top plan view of FIG. 4 shows an arm 175c upon which the sensor 175 is attached. This arm may be pivoted about pivot 175d which attaches the arm to the frame 120. This enables the positioning of the sensor 175 closer to the stack of cards and the back stop 184 so that the second card may be sensed closer or farther away from the stop by the sensor 175 to control the spacing as described.

In operation, initially an operator depresses the manual feed button TS-4, and the cards 1 are picked up one at a time from stack 102 by means of the suction cup apparatus 133 and are fed to the nip rollers 110 and 110a which remove the cards therefrom. Because the feeding process is faster than the cards move in the roller pairs 203a, b or 204, 204a, the card 1 held in the nip rollers 110, 110a remains stationary until another is fed due to the actuation of sensor 156 by wheel 122 which turns on brake 510 to stop feeding.

Once in the nip roller 110, 110a, leading edge sensor 174 senses the card and when the button TS-4 is again pressed another feed command signal is generated to actuate the clutch of clutch-brake 510. The sensor 156 also actuates the card straightener solenoid 180 upon the occurrence of each rotation of wheel 122. Another card is now picked up as the first card is advanced from nip rollers 110, 110a to rollers 203a, b and 204, 204a and fed directly to belt 202. Sensor 175 is interposed between rollers 203a, b and 204, 204a and generates a feed signal upon the sensing of the leading edge of the first card. This initiates the automatic operation of the machine because the output of sensor 175 automatically re-energizes clutch 510 to feed another card and starts the counter C1. The counter will count the required number of cards encountered by cell 175. Upon the maximum count being achieved, the logic circuit actuates the card height sensor solenoid 139 to adjust the height of stack 102 and actuates brake 510 and brake 508 to stop feeder 100 and belt 202 and trips the camera shutter so that a photograph of the cards on belt 202 may be made. After exposure, the counter returns to zero, the clutch 508 and 510 are reactuated and more cards are fed, counted, and photographed. As has been described, however, this process is automatically terminated if sensor 174 or 175 fail to detect a card, or if the "feed inhibit" or "stop at five" circuits in the control logic circuit are actuated. Normally, however, cards 1 will be delivered to the belt 202 by the feed mechanism 100, photographed and passed to the card receiving mechanism 400 automatically.

At the receiving mechanism 400, the cards are removed from belt 202 by inverting roller and block 404 and 404a and are placed in an inverted overlapping fashion on belt 402. Belt 402 then stacks the cards 1 against stop 402a in the same orientation and sequence as they were stacked in stack 102.

While an embodiment of the invention has been shown and described in detail, it will be understood that various changes and modifications may occur to those skilled in the art without departing from the spirit and scope of the present invention as defined in the appended claims.

What is claimed is:

1. An apparatus for photographing cards having a means for feeding cards successively from a stack of cards, said apparatus including:
  a. means operative to feed individual cards from a stack of cards to a belt one at a time in response to a command signal, said means including;
     means for picking up said cards;
     linkage means for bringing said means for picking up cards adjacent the stack of cards to pick up a single card from the stack;
     means for removing said card from said means for picking up cards;
     belt means for accepting said cards from said removal means to hold and advance a predetermined number of cards for making photomicrographs of the cards held thereon;
     delay means for adjustable delay of feeding of a subsequent card from said stack in order to form a space between successive cards on said belt;
     stack elevation means for elevating said stack upon diminution of the supply of cards in said stack below a predetermined level;
  b. counting means for counting the number of cards fed to said belt;
  c. means responsive to said counting means to stop the feeding means after a predetermined number of cards have been fed to said belt; and
  d. means operative to advance said belt and reactivate said pick up means after a predetermined time interval.

2. The apparatus of claim 1 wherein said means operative to feed cards includes:
  a frame;
  a shaft rotatably mounted to said frame and having cantilever members mounted thereon;
  a suction cup assembly pivotally suspended from said cantilever members;
  a wheel rotatably mounted to said frame;
  a source of motive power for supplying rotational motion to said wheel in response to a command signal;
  a push rod attached to said wheel and mounted eccentrically thereon;
  a lever arm attached to said shaft for displacement thereof, said push rod attached to said lever arm to impart a substantially linear motion to said lever arm to vertically displace said suction cups into proximity with said stack; and
  means operative to displace said suction cup assembly in a horizontal direction subsequent to vertical linear displacement so as to horizontally displace said card to engage said cards with said means to remove said card.

3. The apparatus according to claim 2 wherein said means operative to displace the suction cup assembly includes a cam attached to said frame for mounting said shaft and roller means attached to the suction cup assembly so as to impart substantially a horizontal movement to said assembly.

4. The apparatus of claim 1 wherein said sensor includes:
  a bar having a projecting portion thereon adapted to engage the upper surface of the uppermost card in said stack;

a spring biasing said bar in a position so that it does not engage said stack;

a solenoid to displace the bar downward in response to an actuating signal;

means for urging said projecting portion of said bar into contact with the upper surface of the uppermost card in said stack as said bar is urged downward by said solenoid; and means responsive to the position of said bar to provide a signal indicative of the height of the stack.

5. The apparatus according to claim 1 wherein said delay means includes a card position sensor for determining the position of the leading edge of said card in order to delay the advancement of the second card relative to the first so that a space is provided between said first and second cards on said belt.

6. The apparatus of claim 1 further including means for collecing after the photographing thereof the cards in the same order as they were stacked before the photographing thereof.

7. The apparatus of claim 6 wherein said means for collecting the cards after exposure includes a second belt, a card inverter for placing the cards removed from said first belt face down on said second belt, means for running said second belt at a speed slower than said first belt so that said cards overlap each other when placed on said second belt and a backstop at one end of said second belt against which the cards may abut and form a stack.

8. The apparatus of claim 2 wherein the means for removing cards from said means for picking up cards is a pair of nip rollers whose surfaces move at the same speed as the speed of horizontal displacement of said card.

9. The apparatus of claim 1 wherein said belt has a teflon coating to enable the cards to electrostatically adhere thereto and wherein said apparatus also includes means for electrostatically charging and discharging the cards.

10. An apparatus according to claim 1 wherein delay means includes a sensor whose position is adjustable and a logic circuit which, in response to receiving a signal from the sensor causes said feeding apparatus to feed another card.

11. The apparatus of claim 1 wherein stack elevation means includes:

a frame for supporting the feeding apparatus and elevation means;

a pair of threaded rods rotatably attached to the frame;

a belt for rotating said rods to elevate said platform;

a platform for supporting a stack of cards and adapted to be elevated by said rods;

a clutch brake for coupling motive power to said rods via said belt;

a sensor for sensing the height of said cards for actuating said clutch brake upon the height of said cards being below a predetermined minimum; and a logic current for actuating said sensor.

12. An apparatus according to claim 1 further including a logic circuit which comprises:

means for interrupting the feeding of a card from the stack of cards if the feed apparatus fails to feed a card;

means for interrupting the feeding of a card from the stack of cards if a predetermined number of cards have been fed to the belt;

means for actuating a camera to photograph cards on said belt after a predetermined number thereof have been fed to the belt;

means for reinitiating feeding of a predetermined number of subsequent cards from the stack after the preceeding predetermined number of cards have been photographed; and means to actuate a sensor to determine the height of cards in the stack of cards to be fed in response to a predetermined number of cards having been fed to said belt.

13. An apparatus according to claim 7 wherein said card inverter includes:

a roller having a peripheral outer surface;

gripping means covering said surface of said roller to frictionally engage a card; and means providing a second surface which is complimentary to a portion of the outer peripheral surface of said roller and which extends over a sufficient portion of the peripheral outer surface of said roller to invert a card fed between said second surface and said roller surface upon release of the card.

14. The apparatus of claim 4 wherein said bar has a lower surface, said means responsive to the position of said bar includes a microswitch actuated by the lower surface of said bar, a spring which biases the bar upon energization of the solenoid so that the microswitch is actuated, and a motive source operative upon the energization of said microswitch upon the energization of said solenoid to raise the stack of cards to a position to displace the bar in an upward direction sufficient to overcome the bias of the spring to deactuate the microswitch.

15. The apparatus of claim 1 further including means for straightening the cards in the stack of cards to be fed, and means for actuating said straightening means after each card is fed.

16. The apparatus of claim 3 further including means for straightening the cards in the stack of cards to be fed, and means for actuating said straightening means after each card is fed.

17. The apparatus of claim 15 wherein said means for straightening said stack includes:

an arm pivotally secured to said frame at one end thereof;

a spring biasing said arm away from said stack;

a leaf spring secured at one end thereof to said arm near said pivoted end and resiliently biased toward said stack;

a backstop secured to said frame;

a solenoid actuatable to pivot said arm toward said stack so that said leaf spring presses against said stack and to urge the uppermost cards in the stack against the backstop; and said means for actuating said straightening means includes a sensor adapted to sense the rotation of said wheel, one complete rotation of which corresponds to the feeding of one card from the stack.

18. The apparatus of claim 17 wherein said sensor for sensing the rotation of said wheel is a photocell and said wheel has a portion of the surface thereof provided with a means for actuating said photocell once during each rotation of said wheel.

19. The apparatus of claim 1 further including means for separating the uppermost card in the stack from the stack prior to being removed therefrom.

20. The apparatus of claim 19 wherein said means for separating the uppermost cards comprises first and second nozzles disposed to direct opposing streams of air against opposite sides of said stack.

21. The apparatus of claim 3 wherein said sensor includes:
a bar having a projecting portion thereof adapted to engage the upper surface of the uppermost card in said stack;
spring biasing said bar in a position so that it does not engage said stack;
a solenoid to displace the bar downward in response to an actuating signal;
means for urging said projecting portion of said bar into contact with the upper surface of the uppermost card in said stack as said bar is urged downward by said solenoid; and
means responsive to the position of said bar to provide a signal indicative of the height of the stack.

22. The apparatus according to claim 21 wherein said delay means includes a card position sensor for determining the position of the leading edge of said card in order to delay the advancement of the second card relative to the first so that a space is provided between said first and second cards on said belt.

23. The apparatus of claim 22 further including means for collecting the cards in the same order as they were stacked after the exposure thereof.

24. The apparatus of claim 23 wherein said means for collecting the cards after exposure includes a second belt, a card inverter for placing the cards removed from said first belt face down on said second belt, said second belt being run at a speed slower than said first belt so that said cards overlap each other when placed on said second belt and a backstop at one end of said second belt against which the cards may abut and form a stack.

25. The apparatus of claim 24 wherein means for removing cards from said means for picking up cards is a pair of nip rollers whose surface moves at the same speed as the horizontal displacement of said card.

26. The apparatus of claim 25 wherein said belt has a teflon coating to enable the cards to electrostatically adhere thereto and means for electrostatically charging and discharging the cards.

27. An apparatus according to claim 26 wherein said delay means includes a sensor whose position is adjustable, and a logic circuit which, in response to receiving a signal from the sensor causes said feeding apparatus to feed another card.

28. The apparatus of claim 27 wherein said stack elevation means includes:
a frame for supporting both the feeding apparatus and elevation means;
a pair of threaded rods rotatably attached to the frame;
a belt for rotating said rods to elevate said platform;
a platform for supporting a stack of cards and adapted to be elevated by said rods;
a clutch brake for coupling motive power to said rods via said belt;
means for sensing the height of said cards in said stack for actuating said clutch brake upon the height of said cards being below a predetermined minimum; and
a logic circuit for actuating said sensor.

29. An apparatus according to claim 28 further including a logic circuit which comprises:
means for interrupting the feeding of a card from the stack of cards if the feed apparatus fails to feed a card;
means for interrupting the feeding of a card from the stack of cards if a predetermined number of cards have been fed to the belt;
means for actuating a camera to photograph cards on said belt after a predetermined number thereof have been fed to the belt;
means for reinitiating feeding of a predetermined number of subsequent cards from the stack after the preceeding predetermined number of cards have been photographed; and
means to actuate a sensor to determine the height of cards in the stack of cards to be fed in response to a predetermined number of cards having been fed to said belt.

30. An apparatus according to claim 29 wherein said card inverter includes:
a roller;
gripping means covering said surface of said roller to frictionally engage a card; and
means providing a second surface which is complimentary to a portion of the outer peripheral surface of said roller and extends over a sufficient portion thereof to invert a card fed between said second surface and said roller surface upon release of the card.

31. The apparatus of claim 30 wherein said bar of said stack height sensing means has a lower surface,
said means responsive to the position of said bar includes a microswitch actuated by the lower surface of said bar,
a spring which biases the bar upon energization of the solenoid so that the microswitch is actuated, and
a motive source operative upon the energization of said microswitch upon the energization of said solenoid to raise the stack of cards to a position to displace the bar in an upward direction sufficient to overcome the bias of the spring to deactuate the microswitch.

32. The apparatus of claim 31 further including means for straightening the cards in the stack of cards to be fed, and means for actuating said straightening means after each card is fed.

33. The apparatus of claim 32 wherein said means for straightening said stack includes:
an arm pivotally secured to said frame at one end thereof;
a spring biasing said arm away from said stack;
a leaf spring secured at one end thereof to said arm near said pivoted end and resiliently biased toward said stack;
a backstop secured to said frame;
a solenoid actuatable to pivot said arm toward said stack so that said leaf spring presses against said stack and to urge the uppermost cards in the stack against the backstop; and
said means for actuating said straightening means includes a sensor adapted to sense the rotation of said wheel, one complete rotation of which corresponds to the feeding of one card from the stack.

34. The apparatus of claim 33 wherein said sensor for sensing the rotation of said wheel is a photocell and said wheel has a portion of the surface thereof provided with means for actuating said photocell once during each rotation of said wheel.

35. The apparatus of claim 34 further including means for separating the uppermost card in the stack from the stack prior to being removed therefrom.

36. The apparatus of claim 35 wherein said means for separating the uppermost cards comprises first and second nozzles disposed to direct opposing streams of air against opposite sides of said stack.

* * * * *